United States Patent [19]

Ikeda et al.

[11] Patent Number: 5,157,611
[45] Date of Patent: Oct. 20, 1992

[54] TRACTION CONTROL SYSTEM FOR FOUR-WHEEL STEERABLE VEHICLE

[75] Inventors: Toru Ikeda; Shuji Shiraishi, both of Saitama, Japan

[73] Assignee: Honda Giken Kogyo Kabushiki Kaisha, Tokyo, Japan

[21] Appl. No.: 610,913

[22] Filed: Nov. 9, 1990

[30] Foreign Application Priority Data

Nov. 10, 1989 [JP] Japan .................................. 1-292983

[51] Int. Cl.$^5$ ............................................. B60T 8/32
[52] U.S. Cl. ................... 364/426.02; 180/197
[58] Field of Search ............ 364/424.05, 426.01, 364/426.02, 426.03, 571.01, 571.02; 180/197, 140–143; 280/91

[56] References Cited

U.S. PATENT DOCUMENTS

| 4,818,037 | 4/1989 | McEnnan | 364/426.02 |
| 4,991,103 | 2/1991 | Lin | 364/426.02 |
| 4,998,593 | 3/1991 | Karnopp et al. | 364/426.02 |
| 5,088,040 | 2/1992 | Matsuda et al. | 364/426.02 |
| 5,089,967 | 2/1992 | Haseda et al. | 364/426.02 |

Primary Examiner—Gary Chin
Attorney, Agent, or Firm—Armstrong & Kubovcik

[57] ABSTRACT

A traction control system for a four-wheel steerable vehicle includes a reference value generating circuit for generating a reference value for detecting a slippage of a drive wheel in a driving state, an output torque control device for controlling the torque of the drive wheel on the basis of an output from said reference value generating circuit so as to bring said drive wheel into a predetermined slipping state, and a reference value correcting circuit for correcting the reference value on the basis of a rear wheel steering angle. This makes it possible to insure a steering stability in a critical condition when a misalignment has been produced in phases of the front and rear wheels.

1 Claim, 5 Drawing Sheets

TRACTION CONTROL SYSTEM FOR FOUR-WHEEL STEERABLE VEHICLE

BACKGROUND OF THE INVENTION

1. Field of the Invention

The present invention relates to a traction control system for a four-wheel steerable vehicle, comprising a reference value generating means for generating a reference value for detecting a slippage of a drive wheel in a driving state, and an output torque control means for controlling the torque of the drive wheel on the basis of an output from the reference value generating means so as to bring the drive wheel into a predetermined slipping state.

2. Description of the Prior Art

There is a traction control system conventionally known, for example, from Japanese Patent Publication Kokoku No. 48334/76, in which the slippage of the drive wheel in a driving state is detected on the basis of a reference value, and the torque of the drive wheel is reduced in accordance with such slippage, thereby preventing an excessive slipping of the drive wheel.

When the above traction control system is applied to a four-wheel steerable vehicle of a front wheel drive type, a good accelerating property similar to that in the prior art is achieved because the stability of the vehicle is excellent during driving with the front and rear wheels being in the same phase condition. However, when the front and rear wheels are turned from the same phase condition to a reverse phase condition or are held in the reverse phase, the understeering tendency of the vehicle is weakened and for this reason, it is necessary to reduce the lateral force of the front wheel to eliminate such tendency. It is known that the critical lateral force of a tire is reduced following an increase in slip rate, as shown in FIG. 5, when the slippage of the drive wheel is controlled. If the slip rate is controlled to a constant level, the critical lateral force becomes substantially constant. Therefore, when the front and rear wheels are turned from the same phase condition to the reverse phase condition or are held in the reverse phase, the lateral force of the front wheel becomes too large, thereby making it difficult to insure the steering stability.

SUMMARY OF THE INVENTION

Accordingly, it is an object of the present invention to provide a traction control system for a four-wheel steerable vehicle, wherein the steering stability in a critical condition can be insured when the phases of the front and rear wheels are misaligned.

To achieve the above object, according to the present invention, there is provided a traction control system for a four-wheel steerable vehicle, comprising a reference value generating means for generating a reference value for detecting a slippage of a drive wheel in a driving state, and an output torque control means for controlling the torque of the drive wheel on the basis of an output from the reference value generating means so as to bring the drive wheel into a predetermined slipping state, wherein the system further includes a reference value correcting means for correcting the reference value on the basis of a rear wheel steering angle.

With the above construction, the reference value is corrected on the basis of the rear wheel steering angle and therefore, even if a misalignment is produced in phases of the front and rear wheels, the torque to a drive wheel can be controlled in consideration of such misalignment of the phases, making it possible to insure a balanced critical lateral force of the drive wheel from the viewpoints of the steerability and stability of the vehicle which is being driven.

The above and other objects, features and advantages of the invention will become apparent from a reading of the following description of the preferred embodiment, taken in conjunction with the accompanied drawings.

DESCRIPTION OF THE PREFERRED EMBODIMENTS

The present invention will now be described by way of embodiments with reference to the accompanied drawings.

Figure 1:
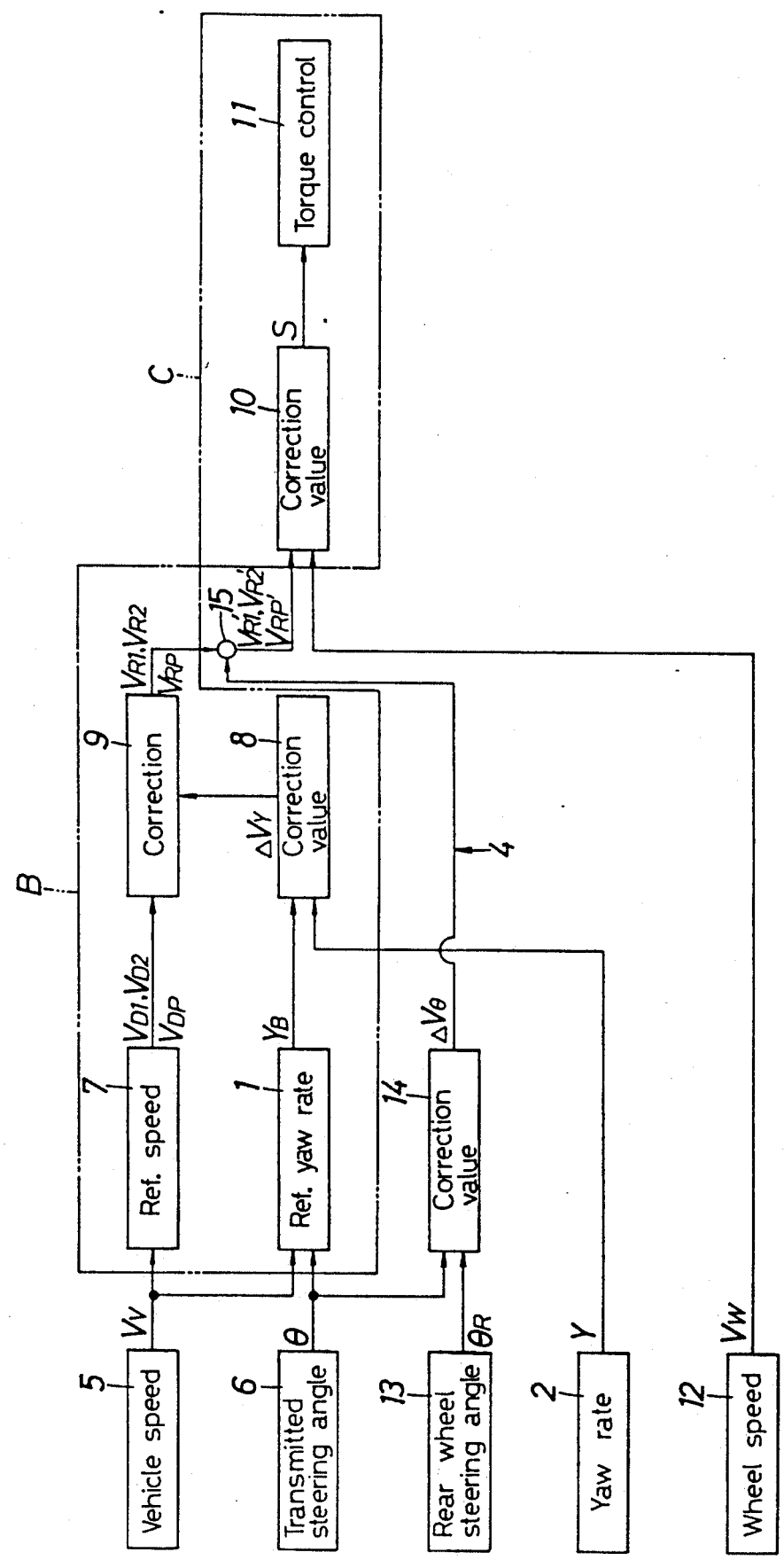
FIG. 1 is a block diagram illustrating an arrangement of a first embodiment of the present invention.

Referring first to FIG. 1 illustrating a first embodiment of the present invention, a traction control system according to this embodiment comprises a reference value generating means B for generating a reference value for detecting the slippage of a drive wheel in a driving state, an output torque control means C for controlling the torque of the drive wheel on the basis of an output from the reference value generating means B, so that the drive wheel is brought into a predetermined slipping state, and a reference value correcting means 4.

Figure 2:
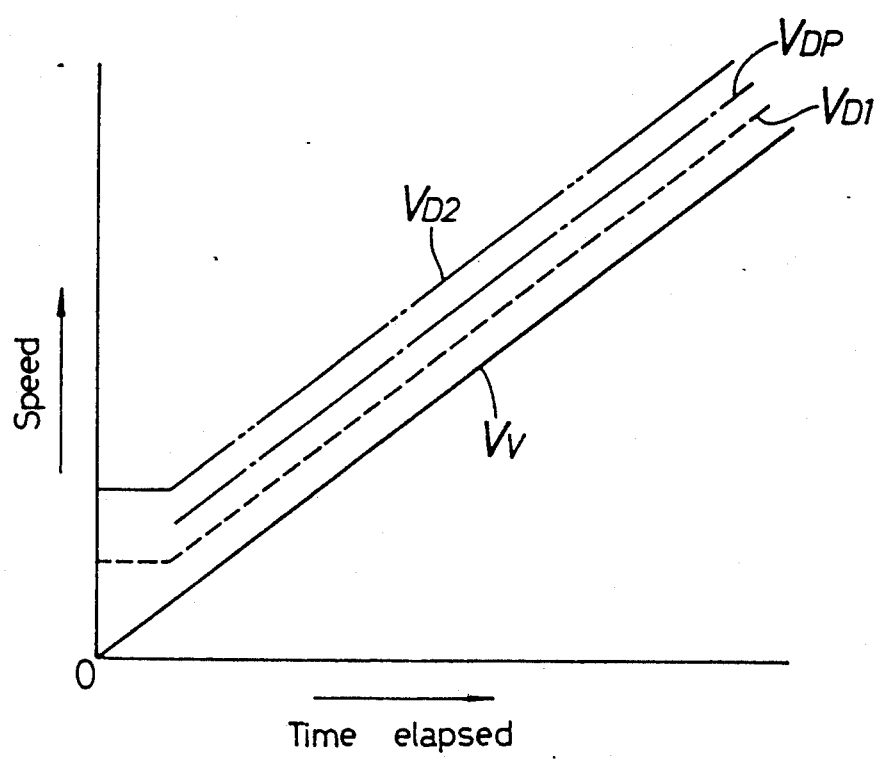
FIG. 2 is a graph illustrating a relationship of the reference speed relative to the vehicle speed.

The reference value generating means B comprises a reference yaw rate generating circuit 1 for generating a reference yaw rate $Y_B$, a reference speed determining circuit 7, a correction value determining circuit 8, and a correcting circuit 9. The reference yaw rate generating circuit 1 generates a reference yaw rate $Y_B$ of a four wheel-steerable vehicle on the basis of a vehicle speed $V_V$ detected in a vehicle speed detector 5 and a transmitted steering angle $\theta$ detected in a transmitted steering angle detector 6. The vehicle speed $V_V$ detected in the vehicle speed detector 5 is also applied to the reference speed determining circuit 7 in addition to the reference yaw rate generating means 1. In the reference speed determining circuit 7, a first reference speed $V_{D1}$, a second reference speed $V_{D2}$ and a target speed $V_{DP}$ according to the vehicle speed $V_V$ are determined according to the following expressions (1) to (3):

$$V_{D1} = K_1 \times V_V + C_1 \quad (1)$$

$$V_{D2} = K_2 \times V_V + C_2 \quad (2)$$

$$V_{DP} = K_P \times V_V + C_P \quad (3)$$

wherein each of $K_1$, $K_2$ and $K_P$ a constant of 1 or more set so that $K_1 \leq K_P \leq K_2$, and $V_V < V_{D1} < V_{DP} < V_{D2}$ is established as shown in FIG. 2.

The correction value determining circuit 8 determines a correction speed $\Delta V_Y$ on the basis of a deviation between the reference yaw rate $Y_B$ received from the reference yaw rate generating circuit 1 and an actual yaw rate Y received from a yaw rate detecting means 2.

The correcting circuit 9 corrects the first reference speed $V_{D1}$, the second reference speed VD2 and the target speed $V_{DP}$ which are received from the reference speed determining circuit 7, on the basis of the correction speed $\Delta V_Y$ received from the correction value determining circuit 8. A first reference speed $V_{R1}$, a second reference speed $V_{R2}$ and a target speed $V_{RP}$ which have been obtained after such correction are delivered as reference values from the correcting circuit 9, i.e., the reference value generating means B.

The reference value correcting means 4 is comprised of a correction value determining circuit 14, and an adding portion 15 provided between the reference value generating means B and the output torque control means C.

The correction value determining circuit 14 determines a correction speed $\Delta V_\theta$ for correcting the first reference speed $V_{R1}$, the second reference speed $V_{R2}$ and the target speed $V_{RP}$ delivered from the correcting circuit 9 in the reference value generating means B, on the basis of a deviation between the transmitted steering angle $\theta$ obtained in the transmitted steering angle detector 6 and a rear wheel steering angle $\theta_R$ obtained in a rear wheel steering angle detector 13. In the adding portion 15, the correction speed $\Delta V_\theta$ is added to the first reference speed $V_{R1}$, the second reference speed $V_{R2}$ and the target speed $V_{RP}$, thereby providing a first reference speed $V_{R1}'$, a second reference speed $V_{R2}'$ and a target speed $V_{RP}'$ after the correction. These speeds are applied to the output torque control means C. Moreover, the correction speed $\Delta V_\theta$ is set at a value such that as the above-described deviation becomes larger, the first reference speed $V_{R1}'$, second reference speed $V_{R2}'$ and target speed $V_{RP}'$ obtained aft ⓡr the correction become larger.

Although the rear wheel steering angle detector 13 is provided to detect the rear wheel steering angle when the front and rear wheels are steered independently, it is to be understood that for a four wheel-steerable vehicle of a steering angle responsive type in which a steering handle and the rear wheel are interconnected through a mechanical link, the rear wheel steering angle $\theta_R$ may be estimated from the transmitted steering angle -74.

The output torque control means C comprises a correction value calculating circuit 10, and a drive wheel torque control circuit 11. The correction value calculating circuit 10 calculates a correction value S for reducing the drive wheel torque by a PID calculation from the first reference speed $V_{R1}'$, second reference speed $V_{R2}'$ and target speed $V_{RP}'$ obtained after the correction and from a drive wheel speed $V_W$ obtained in a wheel speed detector 12 for detecting the speed of the drive wheel. In the correction value calculating circuit 10, the PID calculation is started when $V_{R1}' < V_W$. If $V_{R1}' < V_W < V_{R2}'$, the PID calculation is continued to produce the correction value S such that the drive wheel speed $V_W$ is equal to the target speed $V_{RP}'$. When $V_W \geq V_{R2}'$ has been established, the correction value S (=100) for reducing the drive wheel torque down to zero is delivered.

The drive wheel torque control circuit 11 controls means related to the drive wheel torque such as an engine output, a drive wheel brake and a continuously variable transmission, and controls the drive wheel torque to reduce it in response to the correction value S from the correction value calculating circuit 10 being increased.

The operation of this embodiment will be described below. The first reference speed $V_{R1}$, second reference speed $V_{R2}$ and target speed $V_{RP}$ provided by the correction using the correction speed $\Delta V_Y$ based on the deviation between the yaw rate Y and the reference yaw rate $Y_B$ are obtained in the reference value generating means B. These reference values are further corrected in the reference value correcting means 4 by the correction speed $\Delta V_\theta$ based on the deviation between the transmitted steering angle $\theta$ and the rear wheel steering angle $\theta_R$. The drive wheel torque is controlled on the basis of the first reference speed $V_{R1}'$, the second reference speed $V_{R2}'$ and the target speed $V_{RP}'$ obtained after such correction. Moreover, because the first reference speed $V_{R1}'$, the second reference speed $V_{R2}'$ and the target speed $V_{RP}'$ are corrected to increase as the deviation between the transmitted steering angle $\theta$ and the rear wheel steering angle $\theta_R$ increases, the traction control is carried out to restore an understeering tendency by reducing a critical lateral force and hence, the traction control is possible in a condition of a sufficient critical lateral force insured.

Figure 3:
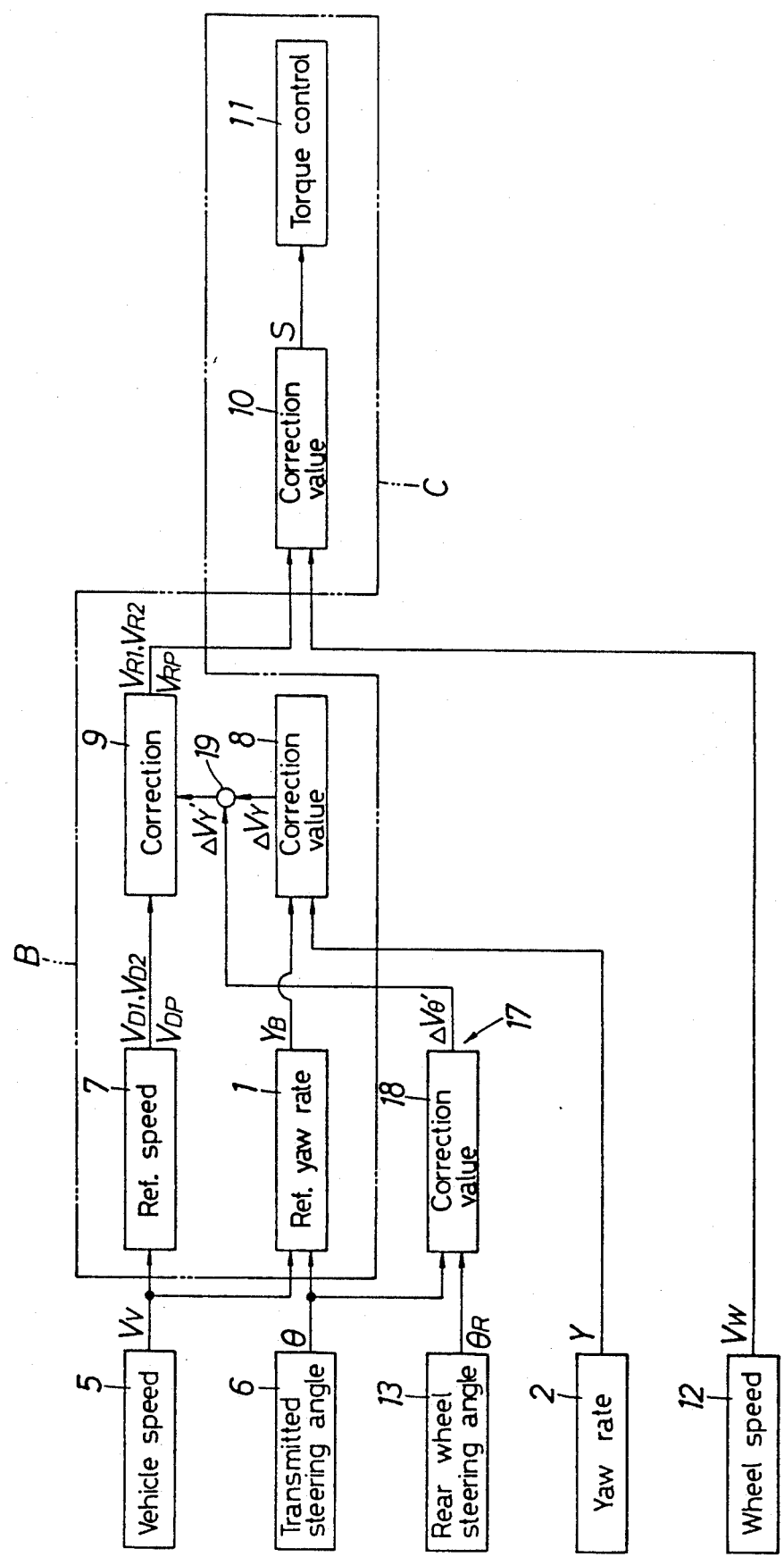
FIGS. 3 and 4 are block diagrams illustrating arrangements of a second and a third embodiment, respectively.

FIG. 3 illustrates a second embodiment of the present invention, wherein parts or components corresponding to those in the first embodiment are identified by the same reference numerals and characters.

A reference value correcting means 17 comprises a correction value determining circuit 18, and an adding portion 19 provided between the correction value determining circuit 18 and the correcting circuit 9 in the reference value generating means B.

The correction value determining circuit 18 determines a correction speed $\Delta V_\theta'$ for further correcting the correction speed $\Delta V_Y$ delivered from the correction value determining circuit 8, on the basis of a deviation between the transmitted steering angle $\theta$ obtained in the transmitted steering angle detector 6 and the rear wheel steering angle $\theta_R$ obtained in the rear wheel steering angle detector 13. The correction speed $\Delta V_\theta'$ is added to the correction speed $\Delta V_Y$ in the adding portion 19, and a correction speed $\Delta V_Y'$ obtained after the correction is applied to the correcting circuit 9.

Thus, the first reference speed $V_{R1}$, the second reference speed $V_{R2}$ and the target speed $V_{RP}$ are speeds corrected into higher values in accordance with the deviation between the transmitted steering angle $\theta$ and the rear wheel steering angle $\theta_R$. This makes it possible to provide an effect similar to that in the previous first embodiment.

Figure 4:
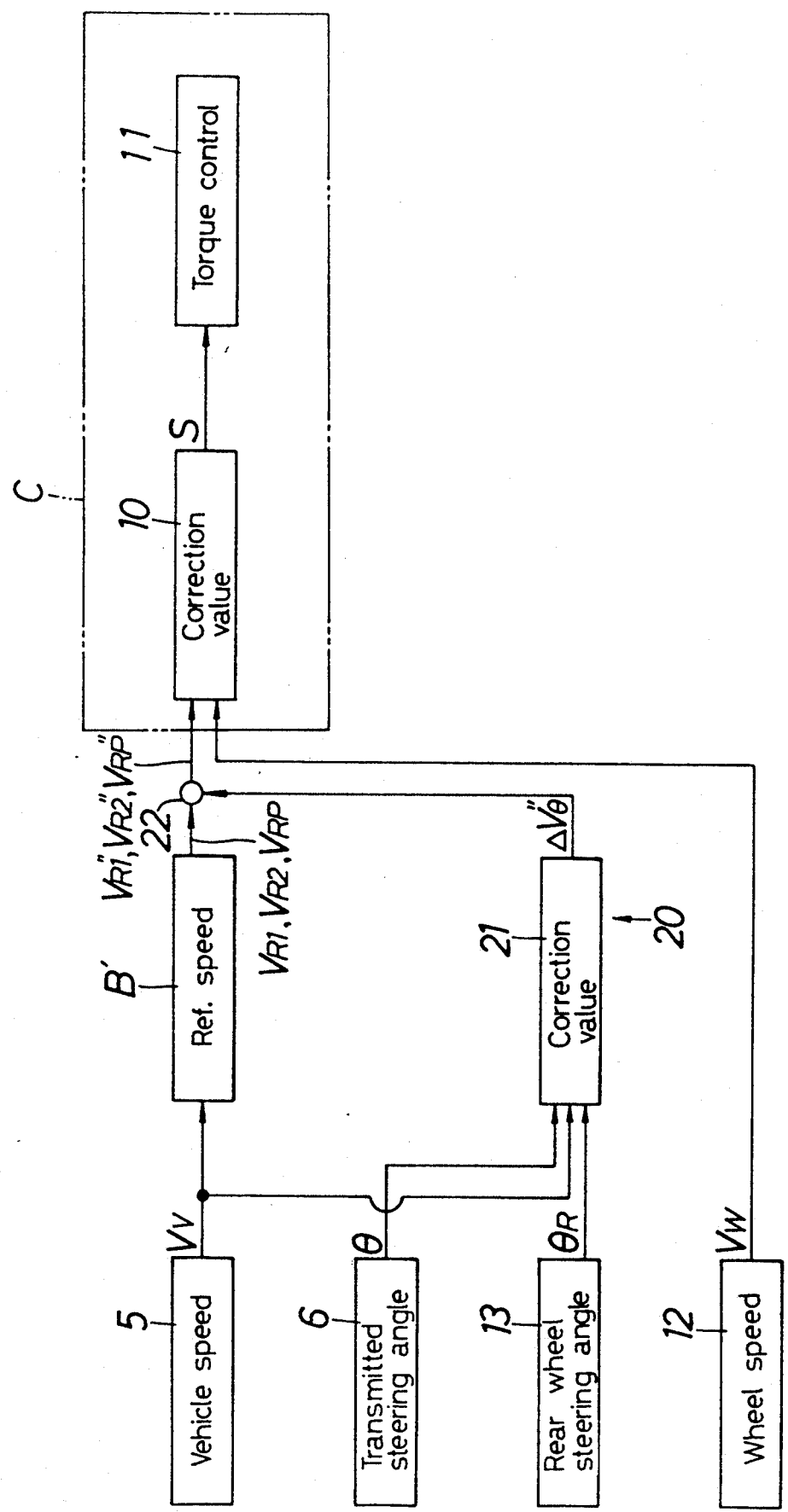
Figure 5:
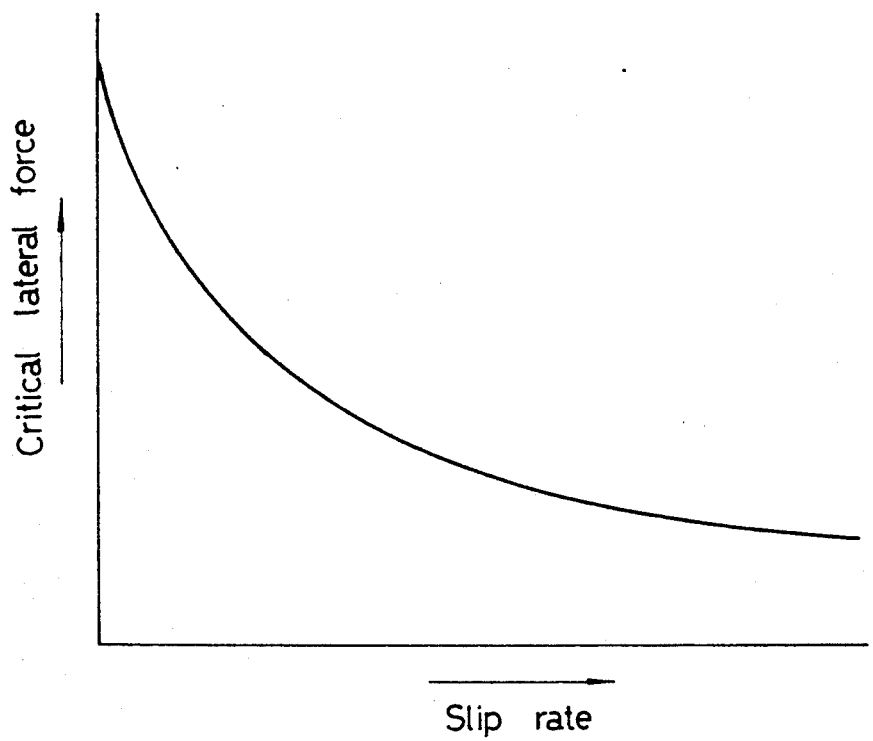
FIG. 5 is a graph illustrating a relationship of the critical lateral force relative to the slip rate.

FIG. 4 illustrates a third embodiment of the present invention, wherein parts or components corresponding to those in the previous embodiments are identified by the same reference numerals and characters.

A reference value generating means B' determines a first reference speed $V_{R1}$, a second reference speed $V_{R2}$ and a target speed $V_{RP}$ on the basis of the vehicle speed $V_V$ detected in the vehicle speed detector 5.

A reference value correcting means 20 is comprised of a correction value determining circuit 21, and an adding portion 22 provided between the reference value generating means B' and the output torque control means C.

The correction value determining circuit 21 determines a correction value $\Delta V_\theta''$ for correcting the first reference speed $V_{R1}$, second reference speed $V_{R2}$ and target speed $V_{RP}$ delivered from the reference value generating means B', on the basis of the transmitted steering angle $\theta$ obtained in the transmitted steering angle detector 6, the rear wheel steering angle $\theta_R$ obtained in the rear wheel steering angle detector 13 and the vehicle speed $V_V$ obtained in the vehicle speed detector 5. This correction value $\Delta V_\theta''$ is added to the first reference speed $V_{R1}$, the second reference speed $V_{R2}$ and the target speed $V_{RP}$ in the adding portion 22, and thus-obtained first reference speed $V_{R1}''$, second reference speed $V_{R2}''$ and target speed $V_{RP}''$ after such correction are applied to the torque control means C.

Therefore, the reference value for detecting the slippage of the drive wheel is corrected in the reference value correcting means 20, and the traction control can be carried out while insuring a sufficient critical lateral force as in the previous embodiments.

Although the reference value of the drive wheel speed has been adopted as a reference value for detecting the slippage of the drive wheel in the above-described embodiments, it will be understood that the slippage of the drive wheel may be detected by a reference slip rate, a variation rate in reference slip rate and a reference drive wheel acceleration. In addition, while the reference value correcting means generates the correction value on the basis of the rear wheel steering angle in the above-described embodiments, the present invention is not limited thereto and the correction value may be generated on the basis of the rear wheel steering angle and the vehicle speed. Further, although the correction value is generated in accordance with the deviation between the transmitted steering angle (front wheel steering angle) and the rear wheel steering angle in the above-described embodiments, the correction value may be generated from a time at which the deviation is turned from a decreasing tendency to an increasing tendency, i.e., from a time at which the rear wheel steering angle is started to decrease from the maximum angle in the same phase condition, or a correction value according to the deviation may be generated from a time at which the rear wheel steering angle becomes a reverse phase. Alternatively, a correction value may be generated so as to rather decrease the reference speed in the same phase condition.

Although the above description has been premised on a front wheel drive vehicle in the above embodiments, it will be understood that the present invention is also applicable to a rear wheel drive vehicle. In such an event, the understeering tendency is likewise reduced when the front and rear wheels are turned from the same phase condition to the reveres phase condition. To insure the critical lateral force of the drive wheel at that time, the target speed may be corrected so that it may be rather reduced.

What is claimed is:

1. A traction control system for a four-wheel steerable vehicle, comprising a reference value generating means for generating a reference value for detecting a slippage of a drive wheel in a driving state, and an output torque control means for controlling the torque of the drive wheel on the basis of an output from said reference value generating means so as to bring said drive wheel into a predetermined slipping state, wherein said system further indludes a reference value correcting means for correcting said reference value on the basis of a rear wheel steering angle.

* * * * *